United States Patent [19]

Lachonius

[11] Patent Number: 4,511,031

[45] Date of Patent: Apr. 16, 1985

[54] CONVEYOR COMPRISING EASILY MOUNTABLE GIRDER SECTIONS

[75] Inventor: Leif Lachonius, Surte, Sweden

[73] Assignee: Aktiobolaget SKF, Goteborg, Sweden

[21] Appl. No.: 438,915

[22] Filed: Nov. 3, 1982

[30] Foreign Application Priority Data

Dec. 9, 1981 [SE] Sweden .................... 8107357

[51] Int. Cl.³ .................................... B65G 21/20
[52] U.S. Cl. ............................. 198/836; 198/860
[58] Field of Search ............. 198/836, 860, 861, 735

[56] References Cited

U.S. PATENT DOCUMENTS

| 3,124,239 | 3/1964 | Kornylak | 198/860 |
| 3,605,994 | 9/1971 | Parlette | 198/836 X |
| 3,669,244 | 6/1972 | Pagdin et al. | 198/860 |
| 3,800,938 | 4/1974 | Stone | 198/836 X |
| 3,825,108 | 7/1974 | Stone | 198/860 |
| 4,046,248 | 9/1977 | Goffredo et al. | 198/861 X |

Primary Examiner—Joseph E. Valenza
Assistant Examiner—Jonathan D. Holmes
Attorney, Agent, or Firm—Eugene E. Renz, Jr.

[57] ABSTRACT

The invention refers to a conveyor incorporating a conveyor belt (1) which runs in a track on a girder (2). The girder (2) is at one or both sides provided with two longitudinal, open ducts (4, 5) which are situated one inside the other and which both can be reached from the outside of the girder (2). Hereby the girder sections can easily be interconnected by means of mounting moldings (8) in one of the ducts (4) at the same time as railings (7) or the like can be mounted in the other duct (5).

1 Claim, 2 Drawing Figures

CONVEYOR COMPRISING EASILY MOUNTABLE GIRDER SECTIONS

The present invention refers to a conveyor of the type which incorporates a conveyor belt which is arranged to be driven and guided in a track on a girder.

Such conveyors are earlier known in different embodiments. An example thereof is shown in Swedish patent specification 375.961. The device according to this patent incorporates a track assembled from U-shaped girders and the conveyor belt consists of supporting plates connected by means of a rope, which plates move on top of the girder in the forward direction and below this in the return direction. The girder can also be arranged vertically. Conveyor tracks of this type are often used in factories for transport of small piece goods and the tracks then run successively in all directions. This means that the tracks must comprise straight as well as curved sections. The length of the different track sections must of course be variable thus that the track can be adapted to the structure of the buildings and the location of the machines. The main elements of the conveyor track, the supporting girder, is generally extruded and the length of the desired sections can be obtained by cutting off the original profile.

It is easily understandable that it is highly important that the different track sections can be mounted in a rapid and easy manner. It is also important that the track can be made in modules, which are interconnected and mounted in the same manner, even if some modules must have a special shape as, e.g. a deflection wheel. A particularly important factor at mounting is also that there must not be any joint, which obstructs the movement of the conveyor belt.

By the present invention the above problems have been solved and it has been provided a conveyor which incorporates a conveyor belt arranged to be driven and guided in a track on a girder and which is characterized thereby that the girder at one or both of its sides is provided with two longitudinal, open ducts, situated one inside the other and both being accessible from the outside of the girder.

In one of the ducts, preferably the inner one, it is possible to arrange mounting moldings which can be screwed on from the outside and which are intended for interconnection of two girder sections, whereas the other one of the ducts, preferably the outer one, has space for mounting of other elements such as railings or the like.

The invention will hereinafter be further described with reference to the accompanying drawings, in which.

Figure 1:
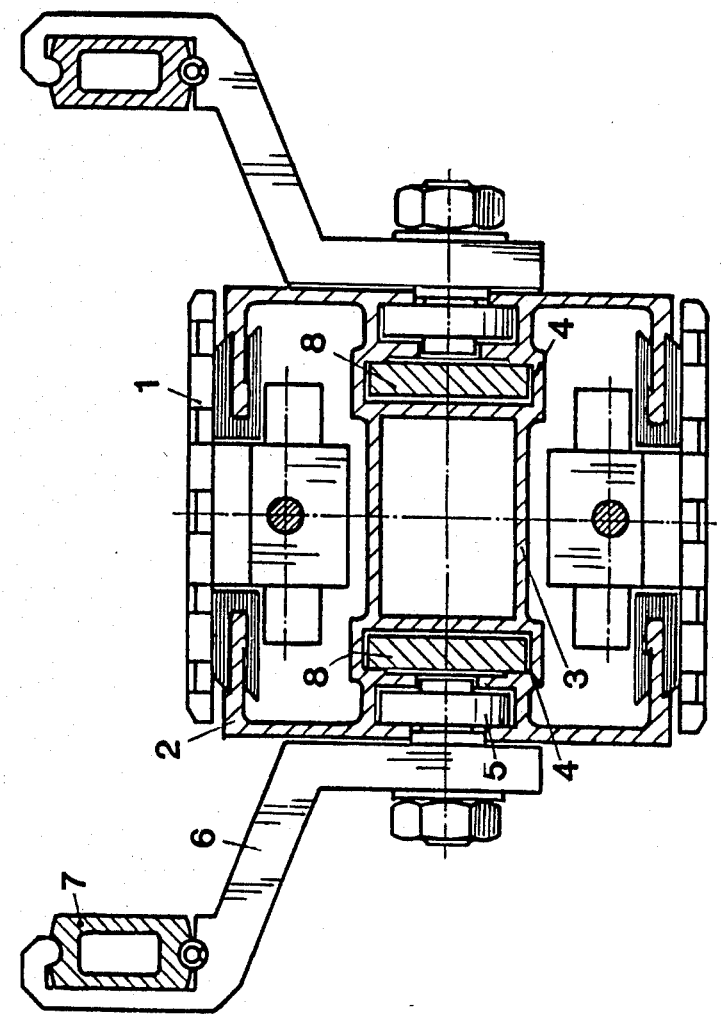
FIG. 1 shows the conveyor according to the invention in a vertical section.

FIG. 1 shows a conveyor incorporating a conveyor belt 1 arranged to be driven and guided in a track on a girder 2. As shown in the figure, the girder is symmetrical about a horizontal plane, which means that the conveyor belt 1 returns on the opposite side of the girder. The supporting girder 2 is also symmetrical about a vertical plane. The girder 2 has a web portion 3 and at its sides are arranged two longitudinal, open ducts 4 and 5. The ducts 4 are intended to house mounting moldings 8, which can be reached from the outside and by means of which it is possible to interconnect two girder sections by means of screws. In the outer duct 5 it is possible to connect, e.g. attachments 6 for railings 7 or other elements. These attachments 6 have a small extension and thereby cover a very small part of the longitudinal opening to the duct 4.

Figure 2:
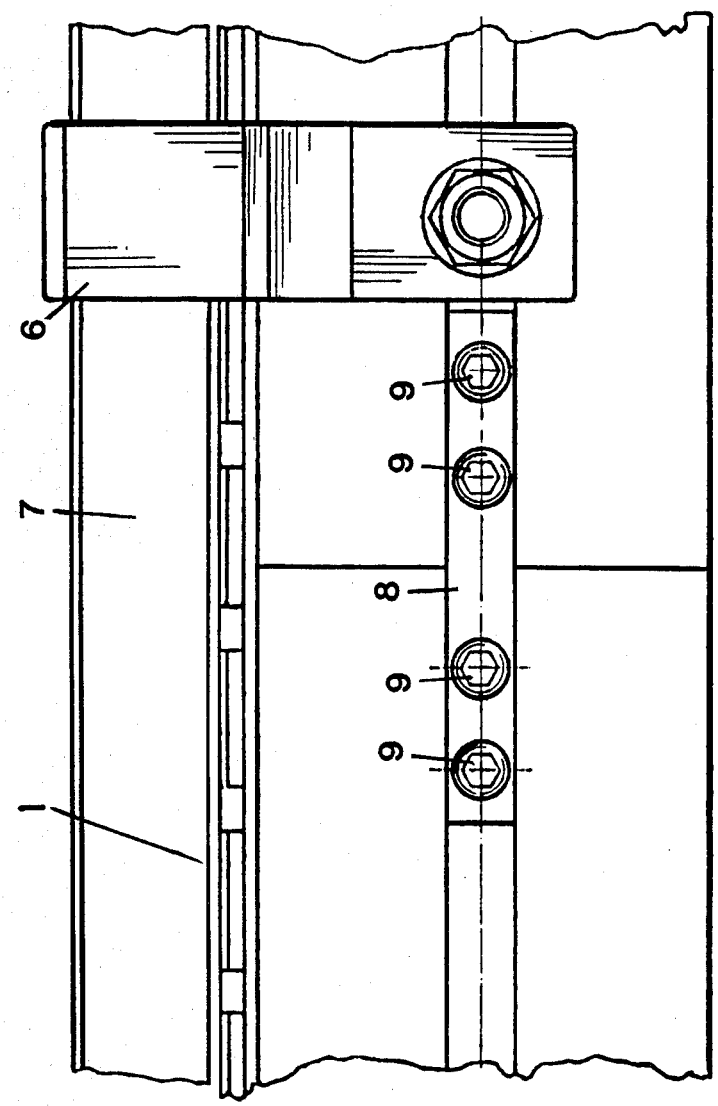
FIG. 2 shows the conveyor seen from the side.

In FIG. 2 two girders are shown from the side in interconnected position. As can be clearly seen, the mounting molding 8 is accessible from the outside and it can be attached by means of screws 9, which preferably are counter-sunk stop-screws, whereby no obstructing projection in the smooth surface of the mounting molding 8 is at hand. The attachment 6 for the railing 7 in FIG. 2 has been arranged at the right hand side of the mounting molding 8. However it can of course also be placed in front of the molding 8 after it has been mounted to the left of the molding 8.

By arranging two parallel longitudinal and open ducts in the manner described hereabove the connection of the sections and the arrangement of railings or the like is possible without these different steps impeding each other.

The invention is not limited to the embodiment shown but can be varied in different manners within the scope of the claims.

I claim:

1. A conveyor assembly comprising a series of girders adapted to be mounted in end-to-end relation, each girder being symmetrical about horizontal and vertical planes and defining conveyor belt forward and return paths on opposing horizontal outer sides of each girder, each girder having an integral transverse web portion having at each end, adjacent to a respective upright wall of the girder, a pair of open longitudinally extending side-by-side inner and outer channels, said channels being situated one inside the other, an elongated connecting member engageable in said inner channels and spanning adjacent girders, first mounting means for securing the connecting member to the vertical inner wall of the inner channel and second mounting means for mounting a railing or the like in the outer channels independently of the first mounting means.

* * * * *